United States Patent [19]

Schutz

[11] 4,023,433
[45] May 17, 1977

[54] POWER TRANSFER
[75] Inventor: Ewald Schutz, Lancaster, Pa.
[73] Assignee: Power Transfer Corporation, Lancaster, Pa.
[22] Filed: June 24, 1974
[21] Appl. No.: 481,993
[52] U.S. Cl. .................................. 74/425; 74/459; 74/464
[51] Int. Cl.² .................. F16H 1/16; F16H 55/06; F16H 55/04; F16H 55/22
[58] Field of Search ..................... 74/425, 464, 459
[56] References Cited
UNITED STATES PATENTS

| | | | |
|---|---|---|---|
| 3,188,877 | 6/1965 | Schmidt | 74/425 |
| 3,190,138 | 6/1965 | MacChesney | 74/425 |
| 3,365,974 | 1/1968 | Lieberman | 74/425 |
| 3,468,179 | 9/1969 | Sedgwick et al. | 74/425 |
| 3,489,026 | 1/1970 | Bond | 74/425 |
| 3,494,215 | 2/1970 | Fengler | 74/409 |

Primary Examiner—Leonard H. Gerin
Attorney, Agent, or Firm—Weiser, Stapler & Spivak

[57] ABSTRACT

The power transfer of the present invention employs a driver having a medial section which includes a plurality of continuous, helical grooves and a plurality of axially aligned transfer material return flow paths. The medial section terminates at each end in a generally cylindrical head, each of which is provided with grooves which communicate with the medial section grooves. The head grooves conduct the power transfer material to the axial paths for axial flow through the driver. The power transfer material flows through the helical grooves, through the head openings, if so embodied or if used, through the head cooperating grooves and the axially aligned paths to travel a complete, circuitous route about and through the driver. A cooperating driven pinion of single or generally double enveloping worm gear configuration positions immediately adjacent the driver and is provided with a plurality of helical grooves of pitch, size and design to overlie the helical grooves of the driver to form closed paths through which the interposed transfer material travels as the driver is rotated. The multiple interposed transfer material contacts between the driver and the driven pinion results in an angular power transfer at greatly reduced friction and power requirements.

43 Claims, 10 Drawing Figures

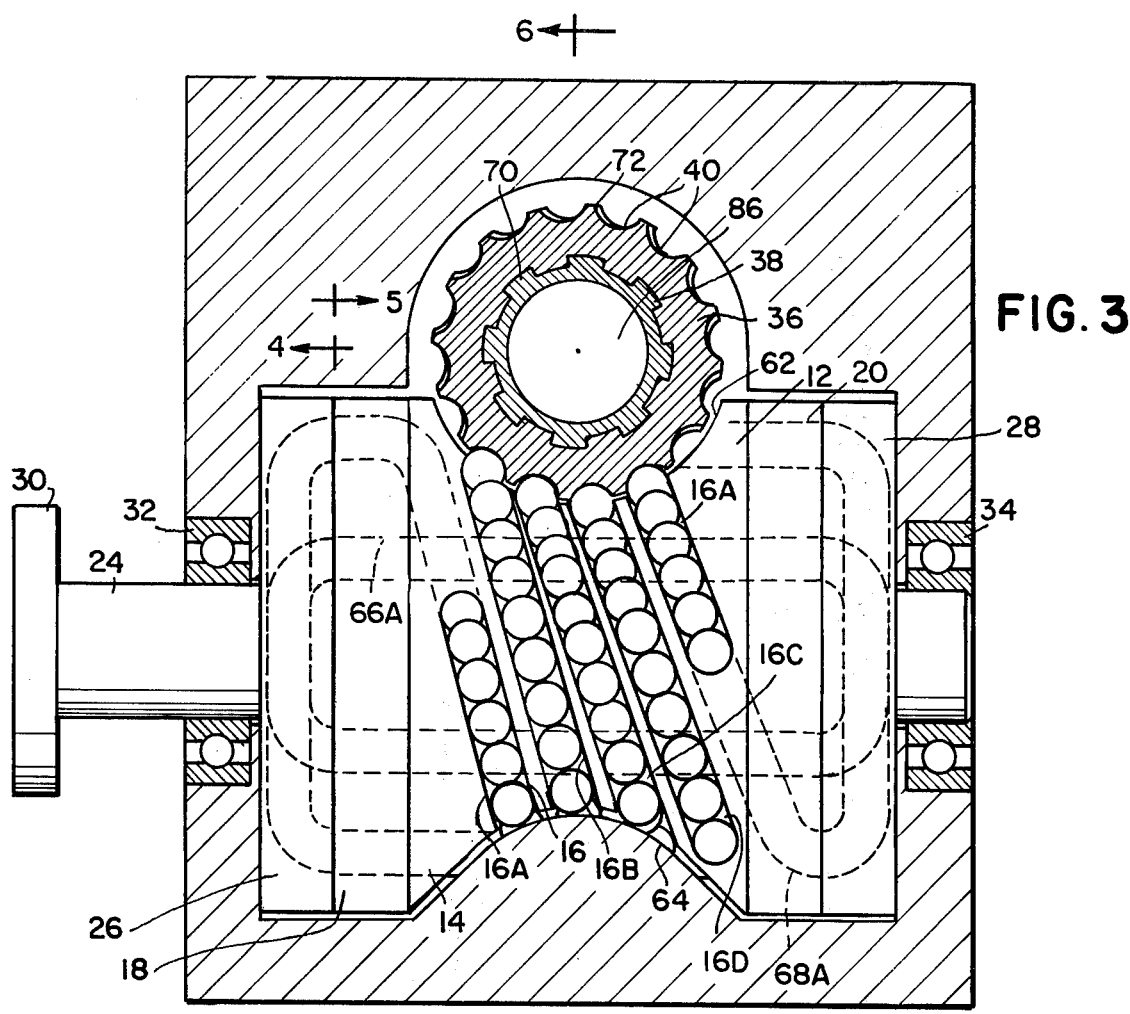
FIG. 3
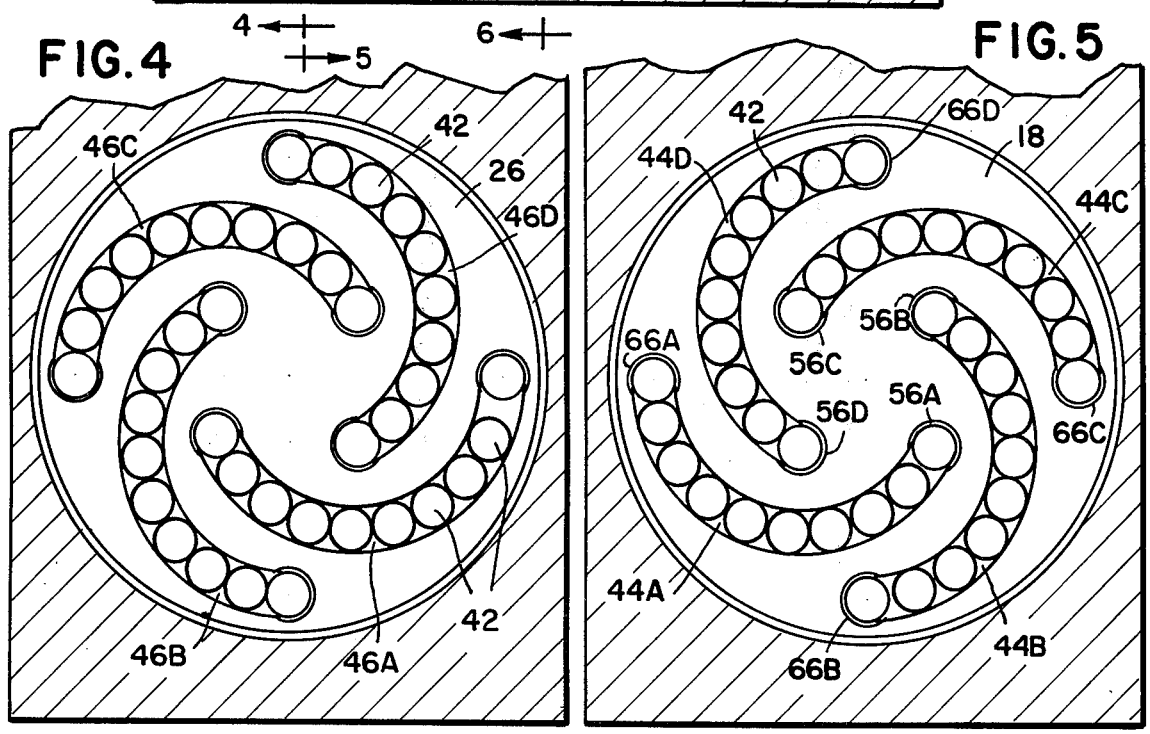
FIG. 4
FIG. 5

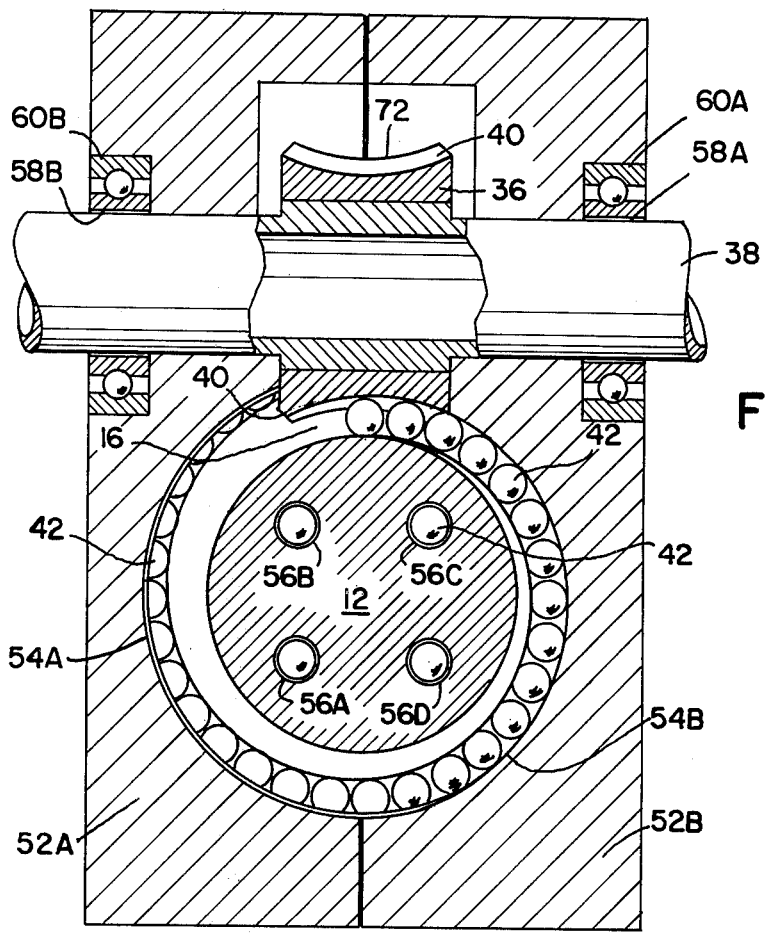
FIG. 6
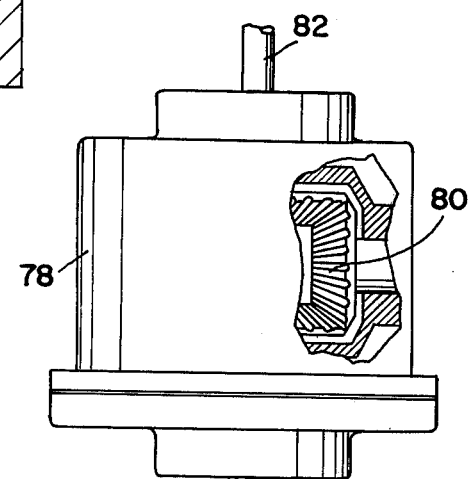
FIG. 7
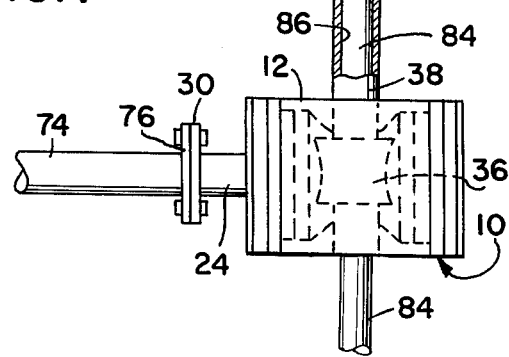

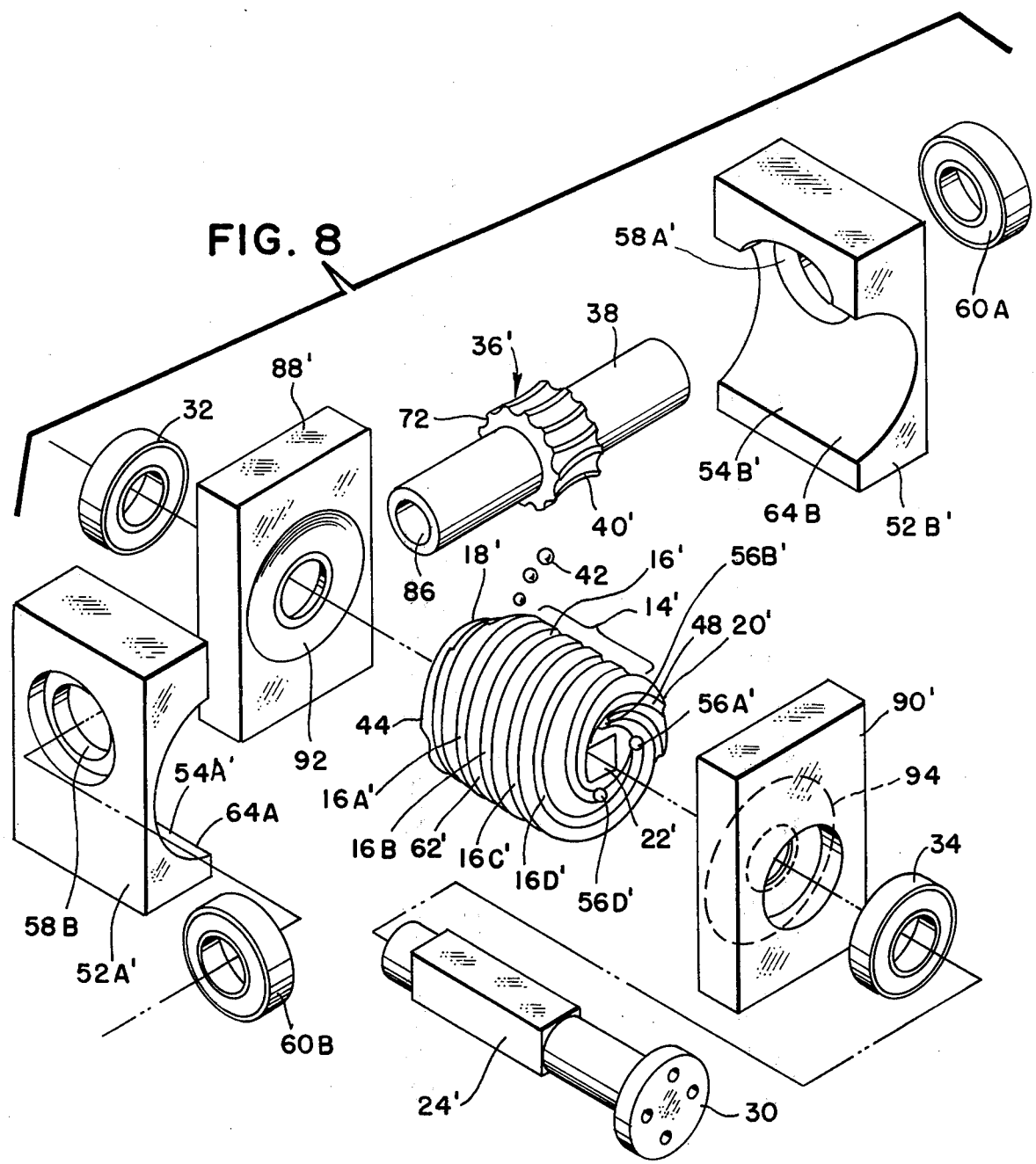

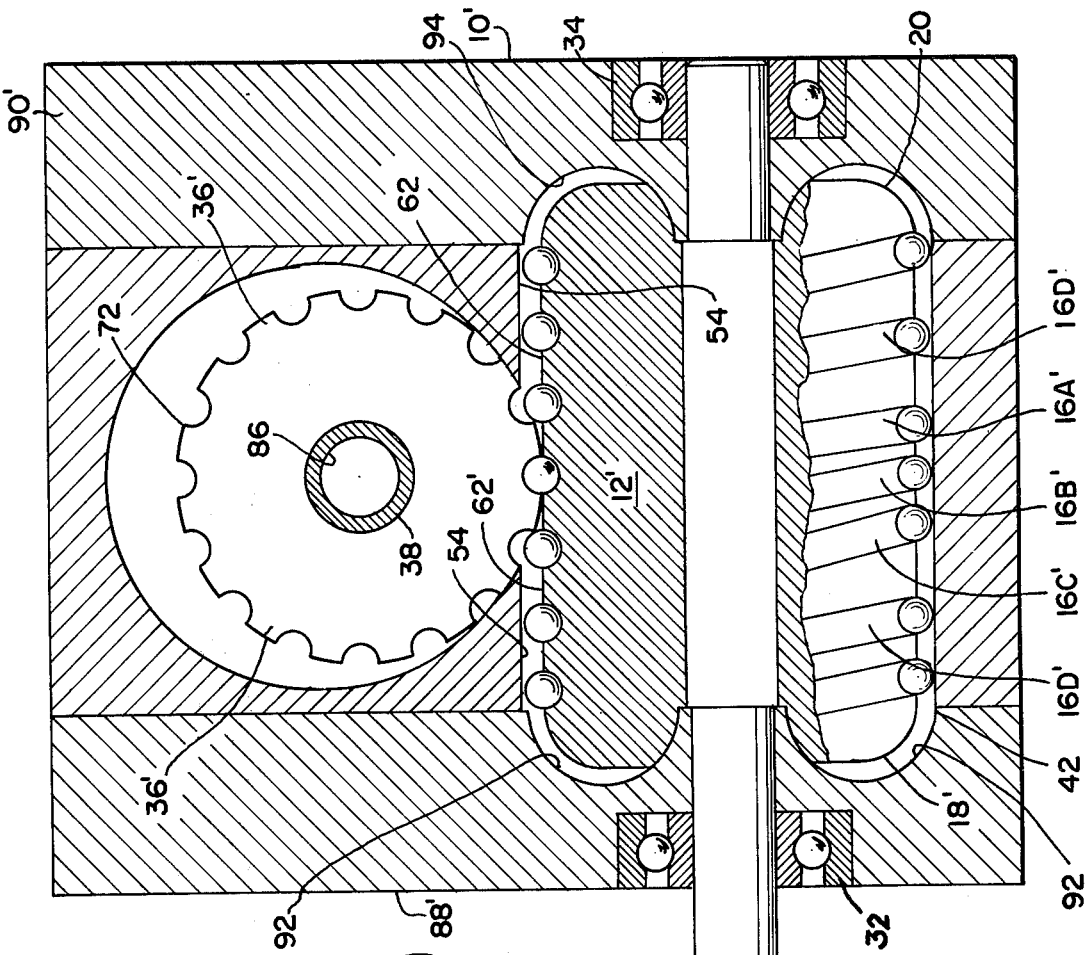
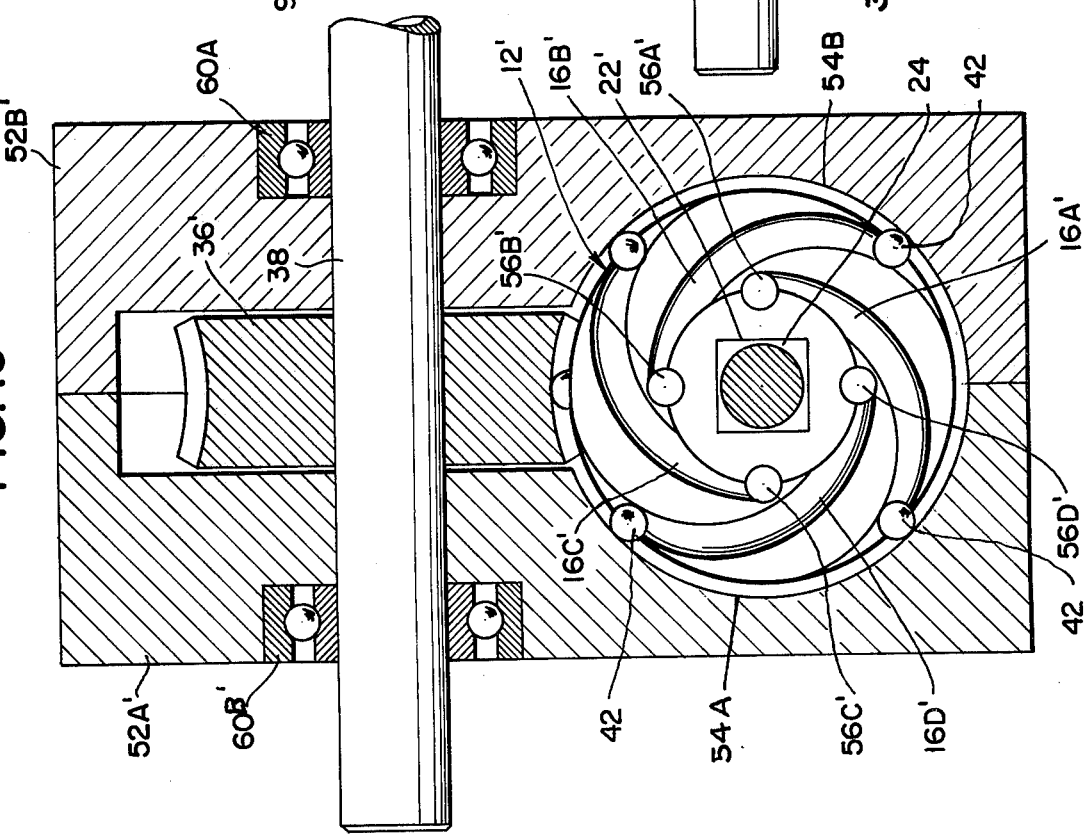

POWER TRANSFER

BACKGROUND OF THE INVENTION

This invention relates generally to the field of power transfer, and more particularly, is directed to a power transfer device incorporating ball action or some other interposed reduced friction material such as rollers, liquid or gases.

It has been the common practice in the past to employ gear systems to transfer energy from one shaft to a second shaft which is angularly oriented with respect to the first shaft. Worm gearing has usually been employed for obtaining large speed reduction between non-intersecting shafts which function at an angular relationship. When a gear engages a straight worm, that is, a worm wherein the outer periphery of all of the teeth are formed of the same diameter, the combination of a gear and a straight worm is usually known as "single enveloping worm gearing". In another system of the type wherein the worm is configured to a shape wherein the cross sectional diameter at the ends of the worm is greater than the cross sectional diameter at its middle, and wherein the mean worm diameter of the worm teeth transcribe an arc which is equal to the arc of a segment of the worm gear drawn through the throat diameter, the combination of a gear and such a worm is known as "double enveloping worm gearing".

One of the most popular power transfer sytems in general use throughout the world today comprises the differential gear employed for use with automobiles. In this system, the differential gears are mounted within a rotatable box frame which is fixedly connected to a large gear, generally designated as the ring gear. The ring gear meshes with a pinion gear which is usually of the bevel pinion type and which is employed to transmit power from the drive shaft to the differential gear box through an angle of ninety degrees. It is common practice to employ helical teeth on both the pinion and on the ring gear in this application.

Ball type power transfer systems in general are known as exemplified in U.S. Pat. Nos. 3,718,051, 2,764,030 and 2,159,325. These devices are considerably different from the instant device in that they do not teach cooperating grooves set at an angular relationship, they do not show hourglass shaped component parts and the use of toothless interacting parts.

In all systems wherein power is transmitted from one shaft to another shaft through ninety degrees by employing worm or bevel gear systems, the power transfer takes place at relatively low efficiency in view of the frictional engagement of the various gear teeth. In the case of the automobile differential system, the frictional losses occasioned by the frictional engagement of the gears is dissipated as heat which is absorbed by the rear axle lubricant, which is radiated to the atmosphere by the component parts or which is revealed as attrition, wear and/or deterioration of the component parts.

SUMMARY OF THE INVENTION

The present invention relates generally to the field of power transmission and more particularly, is directed to a power transfer incorporating a driver and a driven pinion which function at an angular relationship from each other generally through a ball engagement. The means of power transfer can also be any reduced friction material such as rollers, liquid, gases or other material capable of transferring power between the driver and the pinion.

It is an object of the present invention to provide a novel power transfer of the type set forth.

It is another object of the present invention to provide a novel power transfer incorporating a driver, a driven pinion positioned at some angular relationship to the driver, and power transfer means such as, for example, balls, interposed between the driver and the pinion, the said power transfer means or balls substantially reducing the frictional losses between the parts.

It is another object of the present invention to provide a novel power transfer incorporating a driver and a driven pinion, the driver and pinion being provided with cooperating helical grooves to define a material flow path therebetween.

It is another object of the present invention to provide a novel power transfer incorporating a driver and a driven pinion in mutual engagement through a low friction power transfer sytem, the said driver being provided with a plurality of continuous paths to direct the transfer material through and about the driver.

It is a further object of the present invention to provide a novel power transfer incorporating a helically grooved driver, a helically grooved pinion which is functioned by the driver through means of an interposed power transfer material, said driver being provided with a plurality of generated helical grooves which terminate laterally in right and left heads, said heads having cooperating grooves in communication with the helical grooves to provide complete continuous material flow paths.

It is another object of the present invention to provide a novel power transfer incorporating a driver which is rotated by a powered driver shaft, a pinion rotatable by the driver to turn a pinion shaft, said pinion shaft intersecting the driver shaft at some angular relationship and a friction reducing means mutually contacting both the driver and the pinion to enable the pinion to be rotated by the driver at greatly reduced power requirements.

The driver and driven member or pinion of the present invention are each provided with power transfer grooves. Both members have no teeth of any kind. The motivation is created by a travelling third member, herein generally designated power transfer material, which is initiated by the driving member to transfer the power to the driven member. The power transfer is accomplished through indirect contact to thus minimize the effects of friction and wear. The driven member can be rotated in either direction and can be described as being a "toothless" gear.

The present invention includes a driver or drive gear which is embodied in a double enveloping type power transfer system having right and left heads of generally cylindrical configuration and of identical characteristics joined by a medial section which is symmetrical about an axis and which narrows uniformly from the heads to a mid point in a curve which is equal to a cross sectional segment of the circumference of a pinion taken at the mid point, wherein the longitudinal axis of the pinion is positioned at an angular relationship usually of ninety degrees from the longitudinal axis of the driver.

The pinion is of generally the double enveloping worm gear type although this does not preclude the use of single enveloping systems. It will be noted, however, that the pinion differs in construction from a gear in that there are no teeth. The pinion gear varies in diameter along its longitudinal axis evenly from its outer edges to its midpoint in a curve which is equal to an arc forming a portion of the circumference of the driver in the area of intersection. The driver and the driven pinion are each provided with cooperating, helically shaped tooth-like grooves or helically shaped half teeth which define helical paths therebetween in a manner to facilitate passage of some power transfer material, herein depicted and described as balls or bearing balls, within the paths. The grooves of the driver are helically generated and are continuous from one head to the other. The plurality of the grooves in the drive gear medial section are generated about the drive gear to conform to the configuration of the medial section to precisely overlie portions of the grooves of the pinion gear. The grooves communicate with holes or paths which extend completely through around or over the heads in a manner to form continuous paths for the passage of the balls or other power transfer material. Each of the driver heads is formed with cooperating grooves which lead from the surface grooves of the driver to receive and permit passage of the balls or other power transfer material in a continuous manner. Each of the head grooves communicates at one end with a surface groove or head opening and at the other end with a transverse opening which extends completely through the driver core from one head to the other. Thus, the driver grooves, the head grooves, the head egress or ingress openings or paths and the core openings form complete paths within and about the driver to provide for complete freedom of movement of the balls or other power transfer material through and about the driver during the load transfer functions.

Some of the power transfer material is always in simultaneous contact with the grooves of the driven pinion and the grooves of the medial section of the driver in a manner to facilitate power transfer therebetween with a minimum of frictional engagement. Thus, the rotation of the driver about its shaft in one plane can cause simultaneous rotation of the pinion in a second plane having some angular relationship such as ninety degrees with the first plane and with all transmitted forces between the driver and the pinion absorbed in a substantially frictionless manner by means of the power transfer material such as balls acting within the respective grooves. In this manner, the frictional losses which were inherent in prior art types of power transfer units can be substantially reduced to thereby permit energy from a first shaft to be transmitted as rotary power to a second shaft, which operates through some angular relationship generally of ninety degrees, at substantially decreased horsepower requirements.

It is another object of the present invention to provide a novel power transfer unit that is rugged in construction, simple in design and highly efficient in operation.

Other objects and a fuller understanding of the invention will be had by referring to the following description and claims of a preferred embodiment thereof, taken in conjunction with the accompanying drawings, wherein like reference characters refer to similar parts throughout the several views and in which: -

BRIEF DESCRIPTION OF THE DRAWINGS

FIG. 3 is an enlarged, side elevational view of the device of FIG. 1, partially in section and partially broken away to expose details of interior construction.

FIG. 4 is a cross sectional view taken along Line 4—4 of FIG. 3, looking in the direction of the arrows.

FIG. 5 is a cross sectional view taken along Line 5—5 of FIG. 3, looking in the direction of the arrows.

FIG. 6 is a cross sectional view taken along Line 6—6 of FIG. 3, looking in the direction of the arrows.

FIG. 7 is a top plan view showing the invention in use as applied to an automobile differential, portions of which have been broken away to expose interior construction details.

FIG. 8 is an exploded, perspective view of a modified power transfer unit.

FIG. 9 is a side view of the device of FIG. 8, partly in section and partly in elevation.

FIG. 10 is an end elevational view of the device of FIG. 8, partly in section and partly in elevation.

DESCRIPTION OF THE PREFERRED EMBODIMENT OF THE INVENTION

Figure 1:
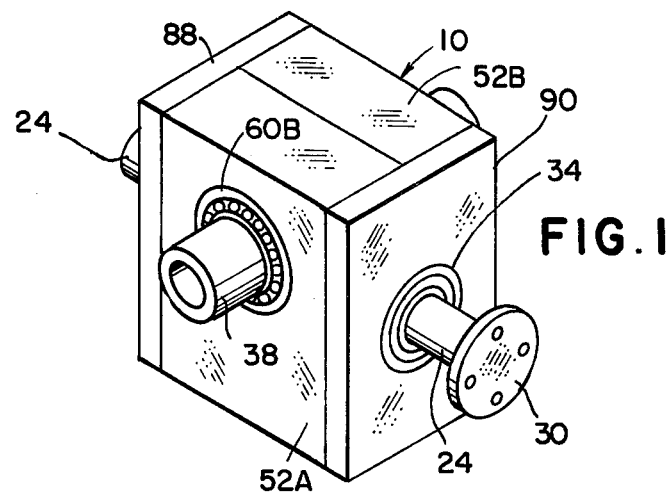
FIG. 1 is a perspective view of the power transfer unit as embodied in a double enveloping worm gear system employing balls as the power transfer material.

Although specific terms are used in the following description for the sake of clarity, these terms are intended to refer only to the particular structure of my invention selected for illustration in the drawings and are not intended to define or limit the scope of the invention.

Figure 2:
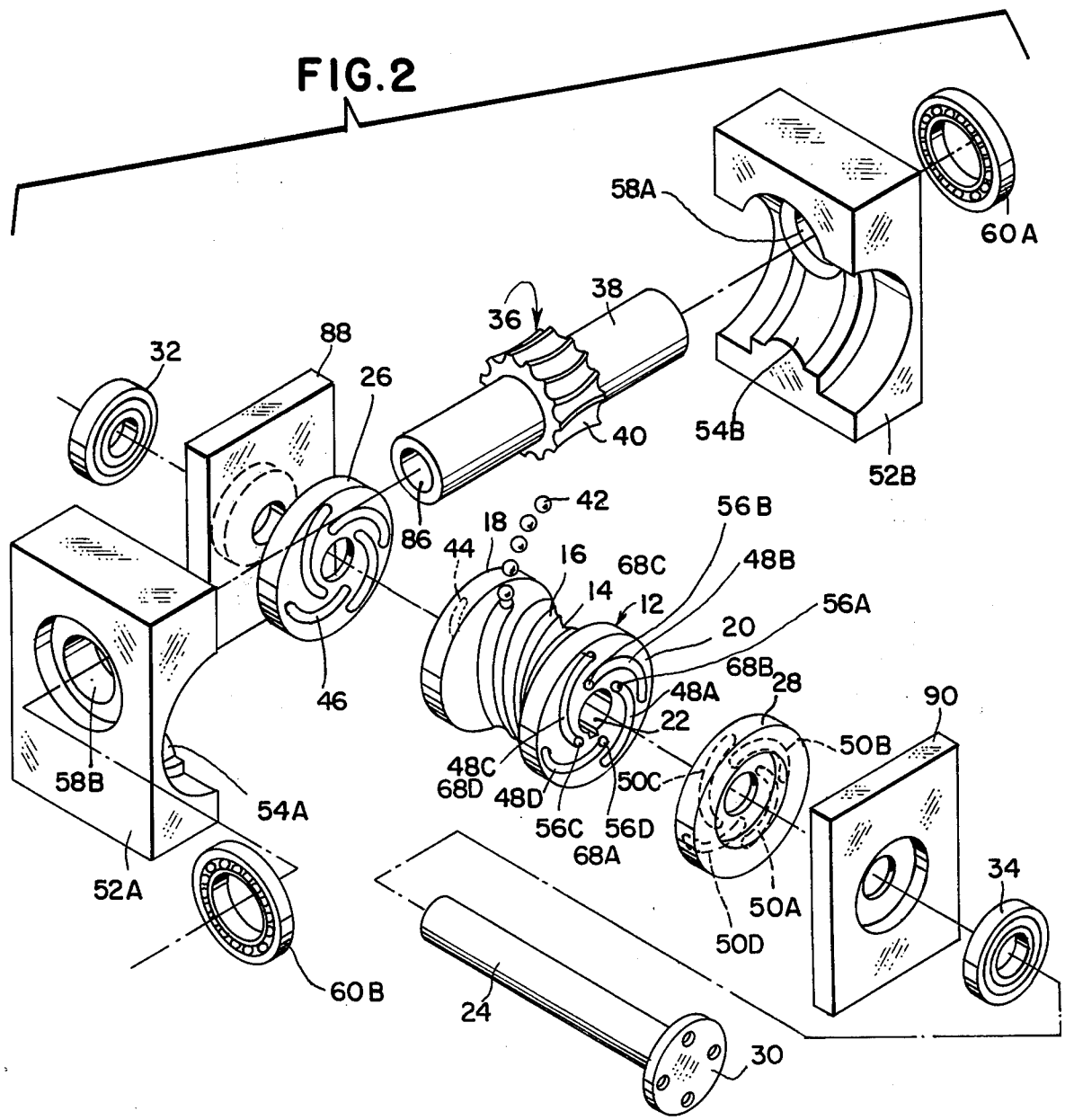
FIG. 2 is an enlarged, exploded, perspective view of the device of FIG. 1.

Referring now to the drawings, I show in FIGS. 1 and 2 a power transfer unit 10 which includes a split housing 52A, 52B and which is fabricated in accordance with the present invention. The power unit 10 comprises generally a driver 12 having a power transfer medial section 14 or spindle which is machined or otherwise formed to include a plurality of helical grooves 16 which longitudinally extend about the periphery thereof. The medial section 14 terminates laterally in a pair of integral left and right heads 18, 20. The driver 12 is formed with a longitudinal opening or bore 22 of suitable cross sectional configuration and is pinned, splined, keyed or otherwise securely affixed to the driver shaft 24 in a manner to rotate the driver as the driver shaft is rotated. A pair of left and right, similar end caps 26, 28 overfit and are securely affixed to the left and right driver heads 18, 20 in a removable manner for ball path completion purposes as hereinafter more fully set forth. The power shaft 24 terminates exteriorly in a suitable power connector construction such as a connection flange 30 to facilitate connecting the unit 10 to a source of rotative power (not shown). The driver shaft 24 is preferably equipped with left and right bearings 32, 34 which may be of the conventional ball bearing type to facilitate driver 12 rotation when the driver shaft 24 is rotated by a power source applied to the connection flange 30.

A driven pinion 36 functions with the driver 12 and is generally configured to form with the driver a system similar in concept to the type of worm gear generally designed as double enveloping worm gearing. The pinion 36 is securely affixed to the pinion shaft 38 in well known manner such as by employing a splined connection 70 (FIG. 3) or other known type of construction. The driven pinion 36 is formed with longitudinally extending helical grooves 40 which are formed to the same helix and to the same shape as the driver grooves 16 to permit balls 42 to function between the driver 12 and the pinion 36 for power transfer purposes.

A plurality of balls 42 completely fill the helical grooves 16 of the driver 12, the left cooperating grooves 44, 46 which are provided in the left head 18 and left end cap 26 and the right cooperating grooves 48, 50 which are respectively formed in the right driver head 20 and in the right end cap 28. A split housing 52A, 52B encloses the driver 12, the pinion 36 and the plurality of balls 42 in a manner to permit rotation of the operating parts therewithin. The split housing halves 52A 52B are each provided respectively with an annular split ball retainer 54A, 54B which are configured to conform to the peripheral configuration of the driver 12 and the driven pinion 36 to maintain the balls 42 within the driver helical grooves 16 in those locations wherein the driver helical grooves 16 and the driven pinion helical grooves 40 are not in operational alignment to retain the balls therebetween during the power transfer procedures. Left and right end plates 88, 90 connect to the split housing halves 52A, 52B to complete the enclosure.

Thus, when the driver 12 is rotated by the application of a power source (not shown) which may be connected at the flange 30, the balls 42 ride within the helical grooves 16 in the medial section 14, through the cooperating grooves 44, 46 at the left head 18, through the cooperating grooves 48, 50 which are formed at the right head 20 and through the axially aligned ball paths 56A, 56B, 56C, 56D (FIG. 6) to complete the circuit. The balls 42 provide rolling contact between the driver 12 which rotates upon its shaft 24 in a first direction and the driven pinion 36 which rotates upon its shaft 38 which is angularly displaced from the driver shaft 24 through ninety degrees. The split housing 52A, 52B is provided with a pair of aligned openings 58A 58B to receive the pinion shaft 38 therethrough in rotative manner. Preferably, right and left ball bearings 60A, 60B are provided and set within the openings 58A, 58B in conventional manner to facilitate rotation of the shaft 38.

Referring now to FIGS. 2-6, it will be seen that the driver is symmetrically formed and includes the power transfer medial section 14 which terminates laterally in the left and right heads 18, 20. The medial section 14 is machined or otherwise formed inwardly from the heads to form the outer periphery to a configuration wherein any diametrical cross section through the longitudinal axis will form peripheral surfaces 62, in the form of non-intersecting, segments of a circle whose radius would be equal to the radius of the pinion gear taken at the outside diameter thereof. It will be noted that the medial section 14 is narrowest at the central axis of the driver 12 and increases along circular paths to join the respective left and right heads 18, 20.

In the illustration shown, the medial section 14 is provided with a plurality of generated helical grooves 16 to provide a plurality of paths for the balls 42 or other power transfer material when the power transfer unit 10 is in operation. In the embodiment illustrated, four separate, side-by-side generated helical grooves 16A, 16B, 16C and 16D are set forth. Each of these grooves communicates at its left end with an opening 66A, 66B, 66C and 66D which is machined or otherwise formed in the left head 18 to define a curved path through the head 18 and to form a smooth, gradual continuation of the path of each respective groove through the head. Each of the curved openings 66A, 66B, 66C, 66D endwardly joins a cooperating groove 44A, 44B, 44C, 44D which is machined or otherwise formed in the head 18 to lead the balls 42 from the respective curved openings to an axially aligned ball path 56A, 56B, 56C, 56D. The axial ball paths 56A, 56B, 56C, 56D are drilled or otherwise formed through the core of the medial section 14 in a manner to lead the balls 42 from the left head 18 through the medial section 14 to exit at the right head 20. The left cooperating grooves 44A, 44B, 44C, 44D form an arcuate path about the left head 18 to lead the balls 42 in a smooth path to form a gradual continuation of the respective helical grooves 16A, 16B, 16C, 16D to minimize misalignment, frictional contact, pyramiding and any other motion which would tend to increase the frictional resistance to the travel of the balls 42 through the device. The respective cooperating grooves 44A, 44B, 44C, 44D lead the balls 42 in a smooth, arcuate path from the curved head openings 66A, 66B, 66C, 66D to the axially aligned ball paths 56A, 56B, 56C, 56D. The left end cap 26 overfits the left head 18 and is secured thereto in a well known manner, such as by employing threaded machine screws (not shown). The left end cap 26 is provided with a plurality of cooperating grooves 46A, 46B, 46C, 46D which align over and conform in configuration to the left head grooves 44A, 44B, 44C, 44D to provide an enclosed path of travel for the balls 42 from the outer periphery of the left head 18 toward the central axis of the driver 12 for movement of the balls from the left head 18 to the right head 20.

The balls 42 travel axially through the interior of the driver 12 from the left head 18 to the right head 20 through the axially aligned ball paths 56A, 56B, 56C, 56D. At the right head 20, the balls 42 exit from the axially aligned ball paths 56A, 56B, 56C, 56D and enter the respective curved, cooperating grooves 48A, 48B, 48C, 48D to travel from the position of the axially aligned ball paths near the longitudinal axis of the driver to a position near the outer periphery of the right head 20 in a respective opening 68A, 68B, 68C, 68D which each follow a curved path through the head 20 to form a smooth, transitional path to facilitate the movement of the balls 42 with a minimum of friction, turbulence, pyramiding or other undesirable effects. Thus, the path of the balls 42 across the driver 12 begins at the curved openings 66A, 66B, 66C, 66D which are positioned near the outer periphery of the left head 18, through the helical grooves 16A, 16B, 16C, 16D and then outwardly through the curved openings 68A, 68B, 68C, 68D which are positioned near the outer periphery of the right head 20. At the left head 18, the path of travel is from the axially aligned openings 56A, 56B, 56C, 56D through the curved, left cooperating grooves 44A, 44B, 44C, 44D and 46A, 46B, 46C, 46D toward the outer periphery of the head 18 and thence through the curved openings 66A, 66B, 66C, 66D. At the right head 20, the path of travel of the balls 42 is from the curved openings 68A, 68B, 68C, 68D near the outer periphery of the head 20 through the right, curved, cooperating grooves 48A, 48B, 48C, 48D and 50A, 50B, 50C, 50D and thence inwardly through the axially aligned ball paths 56A, 56B, 56C, 56D transversely through the interior of the driver 12. The balls 42 exit from the axially aligned paths 56A, 56B, 56C, 56D at the left head 18 to continue the path of travel, through the cooperating left head grooves. The generated grooves 16A, 16B, 16C, 16D; the left head openings 66A, 66B, 66C, 66D; the cooperating grooves 44A, 44B, 44C, 44D; the axial ball paths 56A, 56B, 56C, 56D; the right cooperating grooves 48A, 48B, 48C, 48D; and the right head openings 68A, 68B, 68C, 68D all function together to form a plurality of continuous power transfer material flow paths about and through the drive gear 12.

To facilitate fabrication of the device, the left head 18 is equipped with a left end cap 26 which is provided with the left cooperating grooves 46A, 46B, 46C, 46D. These grooves register over the grooves 44A, 44B, 44C, 44D of the left head 18 to provide an enclosed path of travel of the balls 42 at the left head 18. Similarly, the right head 20 is equipped with a removable right end cap 28 which also is provided with a plurality of right cooperating curved grooves 50A, 50B, 50C, 50D which register over the right head grooves 48A, 48B, 48C, 48D to provide enclosed paths of travel for the balls 42 at the right head.

The driven pinion 36 is secured to the pinion shaft 38 in conventional manner, such as by employing splines 70 to rotate the shaft 38 upon rotation of the driver 12. The pinion 36 is provided with helical grooves 40 which correspond in pitch, width and depth to the helical grooves 16A, 16B, 16C, 16D of the driver 12. As best seen in FIG. 3, at least three of the helical grooves 40 of the pinion 36 are in contact with the balls 42 in all rotative positions so that at least three separate bearing surfaces of helically positioned balls 42 are presented for pinion shaft 38 rotative purposes. The transverse cross sectional diameter of the pinion 36 is equal to the axial cross section diameter of the medial section 14 of the driver 12 (see FIG. 3). In longitudinal cross section, the pinion half teeth or tooth like ridges or pinion ridges 72 are formed to a diameter which is equal to the transverse cross sectional diameter of the driver 12, (see FIG. 6). It will be noted that in the illustrated embodiment both the driver 12 and the pinion 36 are formed with helical grooves 16, 40 both are semi-circular in transverse cross section and both are shaped in longitudinal cross section to a circular diameter of suitable size to mate with the other member when the parts are positioned at ninety degrees. While the grooves 16, 40 have been illustrated as being generally semi-circular in cross section, it will be appreciated that any other workable configuration such as rectangular, triangular, trapezoidal, circular with wear relief, etc. could be employed and still fall within the scope and intent of this invention.

Referring now to FIGS. 8, 9 and 10, I show a power transfer unit 10' which is generally similar in operation to the unit 10 except that the driver 12' is cylindrically formed to provide a straight worm of the general single enveloping type. The modified driver 12' includes a power transfer medial section 14' which terminates laterally in the left and right heads 18' 20'. The medial section 14' is machined to a cylindrical configuration to form a peripheral surface 62' of equal cross sectional diameter throughout. The medial section 14' is provided with a plurality of generated helical grooves 16' which provide a plurality of paths for the balls 42 or other power transfer material such as rollers, liquids or gases (not shown) when the power transfer unit 10' is in operation.

The left and right heads 18', 20' are convex in configuration as best seen in FIG. 8. Four separate, side-by-side generated helical grooves 16A', 16B', 16C' and 16D' are set forth and each of these grooves extends over and about the convex heads 18', 20' in curved, continuous paths. The left and right ends of each of the grooves 16A', 16B', 16C' and 16D' terminate in a respective axially aligned ball path 56A', 56B', 56C', 56C' which extend longitudinally through the modified driver 12'. The groove ends which are formed inthe convex left and right heads 18', 20' form arcuate paths about the heads to lead the balls 42 in a smooth path to form a gradual continuation of the helical grooves 16A', 16B', 16C', 16D' into the axially aligned openings. Left and right end plates 88', 90' overfit the heads 18', 20' and are provided with cooperating concave receses 92, 94. The recesses 92, 94 follow the contours of the heads 18', 20' and are spaced therefrom a distance just sufficient to permit passage of the balls 42 within the grooves without pyramiding or undue frictional contact. It will be appreciated that the hour glass shaped drive gear 12 may similarly terminate laterally in convex left and right heads 18', 20' in the manner illustrated in FIGS. 8 – 10. In such a construction, left and right end plates 88', 90' would be employed instead of the left and right end caps 26, 28 for ball retention and flow path continuation purposes. The cooperating grooves 44A, 44B, 44C, 44D in the left head and 48A, 48B, 48C, 48D in the right head can be machined or otherwise formed deep enough in their respective heads that the power transfer material could be contained wholly therewithin. This would oliviate the need for the overlying grooves 46A, 46B, 46C, 46D in the left end cap and the grooves 50A, 50B, 50C, 50D in the right end cap. Instead, both end caps then need only be formed to conform the peripheral contours of the respective left and right heads 18, 28 to contain the power transfer material 42 therebetween.

In the embodiment illustrated, the driver 12' is provided with an axially aligned opening 22' which may be square or other cross sectional configuration to receive and secure to the shaft 24'. Right and left bearings 34, 32 are carried within the end plates 90', 88' in conventional manner to permit rotation of the shaft 24 when power is applied to the flange 30. A driven pinion 36' functions with the driver 12' and is secured to the pinion shaft 38 in well known manner and is provided with suitable longitudinally extending grooves 40'. A split housing 52A', 52B' encloses the operating parts and are provided in this embodiment with semi-circular ball retainers 54A', 54B' to maintain the balls 42 within the driver grooves. The left and right end plates 88', 90' connect to the split halves 52A', 52B' to complete the enclosure. Pinion shaft bearings 60A, 60B are retained in the split halves 52A', 52B' in conventional manner to facilitate rotation of the pinion shaft 38'.

In operation, as illustrated in FIG. 7, the power transfer unit 10 can be connected to a power shaft 74, such as an automobile transmission shaft, in suitable known manner. In the embodiment shown, a companion flange 76 is affixed to the connection flange 30 to thereby rotate the driver shaft 24 and the driver 12 upon rotation of the power shaft 74. Rotation of the driver shaft 24 about its axis in a first direction causes simultaneous rotation of the driven pinion 36 in a second direction (which is offset at ninety degrees from the first direction) by interaction of the balls 42 between the driver 12 and the pinion 36. In the embodiment illustrated, the pinion shaft 38 is affixed to an automotive differential case 78 to function the differential gears 80. The rotation of the differential case 78 and the differential gears 80 powers the right and left wheel axles 82, 84 in the usual manner for automobile drive purposes. It is noteworthy that the pinion shaft 38 has been formed with a hollow interior 86 to permit the left axle 84 to pass therethrough in axial alignment with the pinion shaft 38. In this manner, the positioning and rotation of the power transfer unit 10 will not interfere with the normal operation of the differential gears 80 and the usual wheel axles 82, 84. While the power transfer unit 10 of the present invention has been shown as applied to an automotive differential gearing system, it will be appreciated that power transfer can be employed with equal facility to any rotative system such as can be found in an airplane, bicycle, motorcycle, marine engines, machine drive systems, etc., wherein it is desirable to transfer power from any rotative force to a driven part.

Although I have described the present invention with reference to the particular embodiments herein set forth, it is understood that the present disclosure has been made only by way of example and that numerous changes in the details of construction and or materials may be resorted to without departing from the spirit and scope of the invention. Thus, the scope of the invention should not be limited by the foregoing specification, but rather only by the scope of the claims appended hereto.

I claim:
1. A power transfer unit of the type including a housing, a drive gear shaft rotatable within the housing and a pinion gear shaft rotatable within the housing comprising
   A. a drive gear associated with the drive gear shaft,
      1. said drive gear being provided with a plurality of continuous power transfer material flow paths,
      2. said drive gear terminating laterally in a pair of spaced heads,
      3. at least some of the flow paths of the drive gear extending longitudinally the entire length of the drive gear and terminating at each head of the drive gear;
   B. a rotatively mounted pinion gear disposed adjacent to said drive gear,
      1. said pinion gear including a plurality of grooves in its outer surface, portions of the flow paths in the drive gear being adapted to overlie portions of the grooves of the pinion gear in a power transfer area; and
   C. power transfer material in moving engagement with the overlying portions of the flow paths of the drive gear and the grooves of the pinion gear in the power transfer area for transferring rotative power between said drive gear and pinion gear.

2. The power transfer unit according to claim 1 wherein the flow paths comprise cooperating grooves formed in at least one of the heads.

3. The power transfer of claim 1 wherein the flow paths include cooperating grooves in both heads.

4. The power transfer unit according to claim 1 wherein the heads are provided with means to form portions of the flow paths.

5. The power transfer unit according to claim 4 wherein at least one head is flat.

6. The power transfer unit accordng to claim 5 wherein the means comprise openings through the heads.

7. The power transfer unit according to claim 6 wherein at least some of the openings are curved.

8. The power transfer unit of claim 5 wherein the means comprises cooperating grooves formed in the heads.

9. The power transfer unit according to claim 8 wherein the cooperating grooves are formed in the outer peripheries of the heads.

10. The power transfer unit according to claim 4 wherein at least one head is convex in configuration.

11. The power transfer unit according to claim 10 wherein portions of the flow paths are formed in the head.

12. The power transfer unit according to claim 5 and an end cap overlying the drive gear head.

13. The power transfer unit according to claim 10 and an end cap overlying the drive gear head.

14. The power transfer unit according to claim 12 wherein the end cap is provided with cooperating grooves.

15. The power transfer unit according to claim 13 wherein the end cap is provided with cooperating grooves.

16. The power transfer unit according to claim 14 wherein the end cap cooperating grooves overlie the cooperating grooves formed in the head to define power transfer material receiving passages.

17. The power transfer unit according to claim 15 wherein the end cap cooperating grooves overlie the cooperating grooves formed in the head to define power transfer material receiving passages.

18. The power transfer unit according to claim 16 wherein the power transfer material receiving passages form portions of the said flow paths.

19. The power transfer unit according to claim 17 wherein the power transfer material receiving passages form portions of the said flow paths.

20. The power transfer unit according to claim 10 and an end plate overlying the head.

21. The power transfer unit according to claim 20 wherein the end plate is provided with a concave recess.

22. The power transfer unit according to claim 21 wherein the convex head is positioned within the concave recess to retain the power transfer material therebetween.

23. The power transfer unit according to claim 5 wherein the drive gear is formed to an hour glass configuration in its medial portion.

24. The power transfer unit according to claim 1 wherein the drive gear is formed to a generally cylindrical configuration.

25. The power transfer unit according to claim 10 wherein the drive gear is formed to a generally cylindrical configuration.

26. The power transfer unit according to claim 1 wherein at least one of the pinion gear shaft and the drive shaft is hollow.

27. The power transfer unit according to claim 26 wherein the pinion gear shaft includes a hollow portion.

28. The power transfer unit according to claim 26 and a work shaft extending through the hollow shaft.

29. The power transfer unit according to claim 1 and an automotive type transmission shaft connected to the drive gear shaft, the transmission shaft rotating the drive gear shaft.

30. The power transfer unit according to claim 1 and an automotive type differential case affixed to the pinion gear shaft.

31. The power transfer unit according to claim 29 and an automotive type differential case affixed to the pinion gear shaft whereby rotative motion applied by the transmission shaft is employed by the power transfer unit to rotate the automotive differential case.

32. The power transfer unit according to claim 30 wherein the differential case includes at least one differential gear.

33. The power transfer unit according to claim 32 which includes a wheel type axle connected to the differential gear.

34. The power transfer unit according to claim 33 wherein at least a portion of the pinion gear shaft is hollow.

35. The power transfer unit according to claim 34 wherein the axle extends through the hollow portion of the pinion gear shaft.

36. In a drive gear suitable for rotation on a shaft, the combination of
   A. a body having a peripheral surface and a longitudinal axis;
   B. said body terminating at its longitudinal ends in spaced heads; and
   C. a plurality of continuous flow paths formed in the said body whereby power transfer material can transverse about the body in a plurality of continuous paths,
      1. at least a plurality of flow paths comprising helically generated grooves formed in the peripheral surface,
      2. the flow paths comprising cooperating grooves formed in the heads.

37. The drive gear according to claim 36 wherein the flow paths comprise internal paths through the interior of the body.

38. The drive gear according to claim 37 wherein the internal paths are axially aligned.

39. The drive gear according to claim 36 wherein the heads are convex in configuration.

40. The drive gear according to claim 36 wherein the heads are flat.

41. The drive gear according to claim 36 wherein the body is generally cylindrical in configuration.

42. The drive gear according to claim 40 wherein the heads are provided with a plurality of openings.

43. The drive gear according to claim 42 wherein at least some of said openings communicate with a helical groove and with a cooperating groove.

* * * * *